(12) United States Patent
Huang et al.

(10) Patent No.: US 10,330,243 B2
(45) Date of Patent: Jun. 25, 2019

(54) STRAIGHT LINE FLEXIBLE POSITIONING DEVICE

(71) Applicant: Guangzhou MINO Automotive Equipment Co., Ltd., Guangzhou (CN)

(72) Inventors: Hai Huang, Guangzhou (CN); Weibing Yao, Guangzhou (CN); Canhui Su, Guangzhou (CN); Zhujing Huang, Guangzhou (CN); Qingping He, Guangzhou (CN); Deren Zhou, Guangzhou (CN); Zhencheng Chen, Guangzhou (CN); Chen Jen Roynold Hsu, Guangzhou (CN)

(73) Assignee: Guangzhou MINO Automotive Equipment Co., Ltd., Guangzhou (CN)

( * ) Notice: Subject to any disclaimer, the term of this patent is extended or adjusted under 35 U.S.C. 154(b) by 0 days.

(21) Appl. No.: 15/084,090

(22) Filed: Mar. 29, 2016

(65) Prior Publication Data

US 2016/0319921 A1 Nov. 3, 2016

Related U.S. Application Data

(63) Continuation of application No. PCT/CN2015/086143, filed on Aug. 5, 2015.

(30) Foreign Application Priority Data

Apr. 30, 2015 (CN) .......................... 2015 1 0218331

(51) Int. Cl.
*B25J 9/02* (2006.01)
*F16H 25/20* (2006.01)
(Continued)

(52) U.S. Cl.
CPC ........ *F16M 11/2092* (2013.01); *B25J 9/0096* (2013.01); *B25J 9/023* (2013.01);
(Continued)

(58) Field of Classification Search
CPC .. F16H 25/20; F16H 2025/204; B25J 9/0096; B25J 9/026
(Continued)

(56) References Cited

U.S. PATENT DOCUMENTS 5,074,160 A * 12/1991 Kasuga ................ B23Q 11/085
 277/410
5,271,292 A * 12/1993 Sawada .................... B25J 9/042
 318/466
(Continued)

FOREIGN PATENT DOCUMENTS

CN 201702528 U * 1/2011 ............. B23K 37/00

*Primary Examiner* — William Kelleher
*Assistant Examiner* — Bobby Rushing, Jr.
(74) *Attorney, Agent, or Firm* — M&B IP Analysts, LLC

(57) ABSTRACT

A straight-line flexible positioning device is presented. The positioning device includes an X-shaft positioning portion, a Y-shaft positioning portion and a Z-shaft positioning portion, wherein the X/Y-shaft positioning portion includes an/a X/Y-shaft pedestal, an/a X/Y-shaft sliding rail, an/a X/Y-shaft sliding table and an/a X/Y-shaft power unit, the Z-shaft positioning portion includes a stand column, a Z-shaft screw shaft, a Z-shaft screw nut and a Z-shaft servo motor, the Z-shaft screw shaft is vertically arranged perpendicular to the X-shaft sliding rail and the Y-shaft sliding rail, the Z-shaft screw nut is fixedly connected with a spline shaft sheathed outside the Z-shaft screw shaft, the top portion of an inner guiding chamber on the stand column is provided with a spline nut, and the top end of the spline shaft extends out of the inner guiding chamber and an installation panel is arranged above the stand column.

11 Claims, 4 Drawing Sheets

(51) Int. Cl.
*F16M 11/20* (2006.01)
*F16M 11/26* (2006.01)
*B25J 9/00* (2006.01)
*F16M 11/18* (2006.01)

(52) U.S. Cl.
CPC ......... *F16M 11/18* (2013.01); *F16M 11/2085* (2013.01); *F16M 11/26* (2013.01); *F16H 2025/204* (2013.01)

(58) Field of Classification Search
USPC ..... 74/490.07, 490.08, 490.09, 490.1, 89.33, 74/89.34, 89.23, 89.32
See application file for complete search history.

(56) References Cited

U.S. PATENT DOCUMENTS

| | | | | |
|---|---|---|---|---|
| 6,241,230 B1* | 6/2001 | Kawaguchi | ............. | B08B 15/00 269/285 |
| 6,622,586 B2* | 9/2003 | Scheidegger | ........ | B23Q 1/5487 74/490.07 |
| 6,655,225 B1* | 12/2003 | Nagai | ................... | F16C 29/008 74/89.33 |
| 6,718,229 B1* | 4/2004 | Takebayashi | .......... | B25J 9/1687 414/749.1 |
| 7,066,649 B2* | 6/2006 | Nagai | ................... | B23Q 11/08 277/410 |
| 7,267,037 B2* | 9/2007 | Smith | ................. | B23D 59/001 125/13.01 |
| 7,707,907 B2* | 5/2010 | Bonev | ...................... | B25J 9/106 74/490.03 |
| 8,397,600 B2* | 3/2013 | Muramatsu | .......... | F16M 11/043 74/490.09 |
| 8,925,408 B2* | 1/2015 | Sakai | ............... | F16H 25/2204 74/89.33 |
| 9,415,557 B2* | 8/2016 | Furukawa | ................ | B30B 1/18 |
| 2008/0048514 A1* | 2/2008 | Hoffmann | ................ | H02K 7/06 310/78 |
| 2008/0087128 A1* | 4/2008 | Garner | ................... | B23Q 1/012 74/490.09 |
| 2011/0132125 A1* | 6/2011 | Chen | ....................... | B25J 9/023 74/473.21 |
| 2014/0326100 A1* | 11/2014 | Day | ........................ | B23Q 1/60 74/490.09 |

* cited by examiner

STRAIGHT LINE FLEXIBLE POSITIONING DEVICE

CROSS-REFERENCE TO RELATED APPLICATIONS

This application is a continuation application of an International Application No. PCT/CN2015/086143 filed August 5, 2015, which claims priority under 35 USC 119 from Chinese Application No. 201510218331.7 CN, filed Apr. 30, 2015, now pending.

TECHNICAL FIELD

The disclosure relates to the field of manufacturing body in white, and particularly to a straight-line flexible positioning device.

BACKGROUND

Multiple vehicle type mixed production is becoming the main trend of the automobile industry because it can adapt to market demand for vehicle model diversification, reduce research and development expenditure, and save cost. A flexible positioning device can accomplish the positioning of various vehicle models, save time while changing the vehicle model, and meet the requirement of the multiple vehicle type mixed production for vehicle body positioning. The present positioning device on the market has the drawbacks of poor flexibility, low carrying capacity, poor positioning precision, large overall dimension, heavy weight, occupying too much spatial space, and limiting the flexibility production of body in white to some extent.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

In order to solve the above-mentioned problems, some of the disclosed embodiments provide a straight-line flexible positioning device, which has high carrying capacity, high precision, and good protective property, and can accomplish the positioning to any point within a certain spatial scope.

Some disclosed embodiments include a straight-line flexible positioning device that includes an X-shaft positioning portion, a Y-shaft positioning portion, and a Z-shaft positioning portion.

In an embodiment, the X-shaft positioning portion includes an X-shaft pedestal, an X-shaft sliding rail arranged on the X-shaft pedestal, an X-shaft sliding table installed on the X-shaft sliding rail, and an X-shaft power unit driving the X-shaft sliding table to move along the X-shaft sliding rail in front and back.

In an embodiment, the Y-shaft positioning portion includes a Y-shaft pedestal connected with the X-shaft sliding table, a Y-shaft sliding rail arranged on the Y-shaft pedestal and perpendicular to the X-shaft sliding rail, a Y-shaft sliding table installed on the Y-shaft sliding rail, and a Y-shaft power unit driving the Y-shaft sliding table to move along the Y-shaft sliding rail in left and right.

In an embodiment, the Z-shaft positioning portion includes a stand column connected with the Y-shaft sliding table and provided with an inner guiding chamber internally, a Z-shaft screw shaft installed in the inner guiding chamber, a Z-shaft screw nut installed on the Z-shaft screw shaft, and a Z-shaft servo motor driving the Z-shaft screw shaft to rotate. The Z-shaft screw shaft is arranged perpendicular to the vertical directions of the X-shaft sliding rail and the Y-shaft sliding rail. The Z-shaft screw nut is fixedly connected with a spline shaft sheathed outside the Z-shaft screw shaft where the top portion of the inner guiding chamber on the stand column is provided with a spline nut for the spline shaft to pass through, and the top end of the spline shaft extends out of the inner guiding chamber. An installation panel is arranged above the stand column.

In another embodiment, the Z-shaft screw shaft is installed on the stand column through a Z-shaft installing base located at the bottom of the inner guiding chamber, a transmission chamber is formed below the inner guiding chamber on the stand column, a driven pulley connected with the Z-shaft screw shaft is installed in the transmission chamber, the Z-shaft servo motor is installed on the stand column through a motor installing plate, and a driving pulley connected with the driven pulley through a synchronous belt is installed in the transmission chamber on an output shaft of the Z-shaft servo motor.

In another embodiment, the X-shaft power unit includes an X-shaft screw shaft installed on the X-shaft pedestal parallel to the X-shaft sliding rail, an X-shaft screw nut installed on the X-shaft screw shaft and connected with the X-shaft sliding table, and an X-shaft servo motor driving the X-shaft screw shaft to rotate.

In yet another embodiment, the X-shaft screw shaft is installed on the X-shaft pedestal through an X-shaft installing base at the end portion. The X-shaft screw shaft is connected with the output shaft of the X-shaft servo motor through a coupling, an X-shaft limiting stopper is arranged on the X-shaft pedestal, and the X-shaft sliding table is provided with a collision block that can be matched with the limiting stopper to limit the stroke of the X-shaft sliding table.

In yet another embodiment, the X-shaft sliding rail is arranged at both sides of the X-shaft screw shaft respectively. The X-shaft sliding table is installed on the X-shaft sliding rail through an X-shaft sliding block and the X-shaft pedestal is installed with an X-shaft side protecting plate at the outside of the two X-shaft sliding rails The X-shaft pedestal is installed with an X-shaft upper protecting plate at the top portion of the X-shaft side protecting plate, the cross section of the X-shaft sliding table is in a shape of hollow square with a via hole in the middle part, and the X-shaft sliding table passes through the inside of the X-shaft upper protecting plate.

In yet another embodiment, the X-shaft pedestal is provided with a ruler for indicating the position of the Y-shaft pedestal and the X-shaft pedestal is installed with an X-shaft aligning base and an X-shaft aligning block installed on the X-shaft aligning base.

In yet another embodiment, the Y-shaft power unit includes a Y-shaft screw shaft installed on the Y-shaft pedestal parallel to the Y-shaft sliding rail, a Y-shaft screw nut installed on the Y-shaft screw shaft and connected with the Y-shaft sliding table, and a Y-shaft servo motor driving the Y-shaft screw shaft to rotate.

In yet another embodiment, the Y-shaft screw shaft is installed on the Y-shaft pedestal through a Y-shaft installing base at the end portion, the Y-shaft screw shaft is connected with the output shaft of the Y-shaft servo motor through a coupling, a Y-shaft limiting stopper is arranged on the Y-shaft pedestal, and the Y-shaft sliding table is provided with a collision block that can be matched with the limiting stopper to limit the stroke of the Y-shaft sliding table.

In yet another embodiment, the Y-shaft sliding rail is arranged at both sides of the Y-shaft screw shaft respectively, the Y-shaft sliding table is installed on the Y-shaft sliding rail through the Y-shaft sliding block, and the Y-shaft pedestal is installed with a Y-shaft side protecting plate at the outside of the two Y-shaft sliding rails. The Y-shaft pedestal is installed with a Y-shaft upper protecting plate at the top portion of the Y-shaft side protecting plate, the cross section of the Y-shaft sliding table is in a shape of hollow square with a via hole in the middle part, and the Y-shaft side protecting plate passes through the inside of the Y-shaft sliding table.

In yet another embodiment the Y-shaft pedestal is provided with a ruler for indicating the position of the stand column and the Y-shaft pedestal is installed with a Y- shaft aligning base 214 and a Y-shaft aligning block 215 installed on the Y-shaft aligning base 214.

The disclosed embodiments ensure that while the straight-line flexible positioning device is working, the X-shaft position portion, the Y-shaft positioning portion, and the Z-shaft positioning portion jointly form a space Cartesian coordinate system to accomplish the positioning to any point within a certain scope through an installation panel. The X-shaft position portion, the Y-shaft positioning portion, and the Z-shaft positioning portion are mutually independent modules and can be disassembled to recombine, thus quickly establishing positioning units with different strokes. In the Z-shaft positioning portion, the Z-shaft servo motor runs and drives the Z-shaft screw shaft in the stand column to perform a rotational motion, the Z-shaft screw shaft converts the rotational motion of the Z-shaft servo motor into a vertically lifting motion of the Z-shaft screw nut, and the Z-shaft screw nut pushes the installation panel installed on the spline shaft to perform the vertically lifting motion. When the installation panel is in the lifting motion, the matching of the spline shaft and the spline nut are directly used for guiding, which occupies little space, has good rigidity, has high load, and meets heavy-load high-precision positioning requirements.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
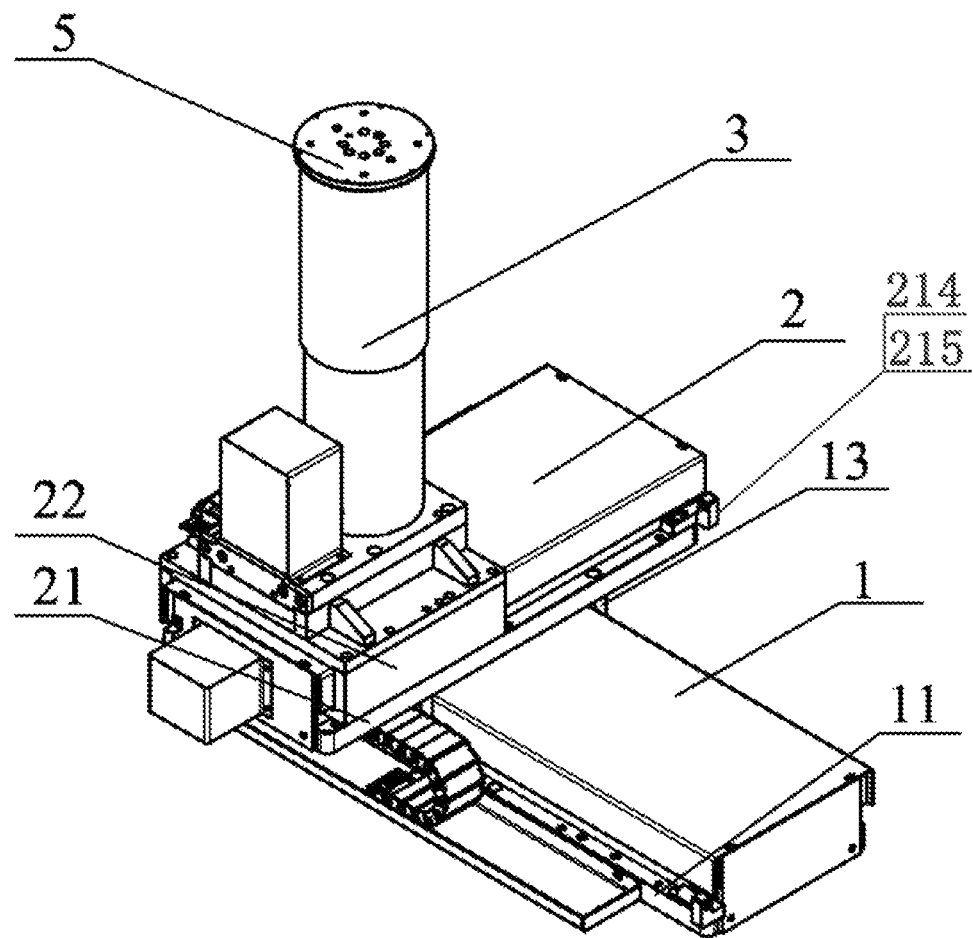
FIG. 1 is an isometric view of an embodiment of the invention.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
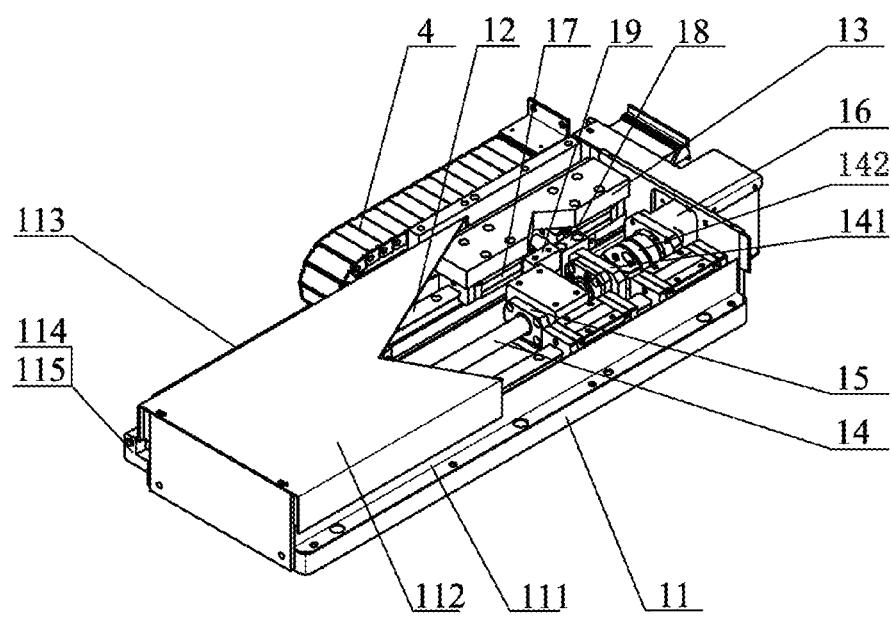
FIG. 2 is a structural schematic diagram of the X-shaft positioning portion of an embodiment of the invention.
Figure 3:
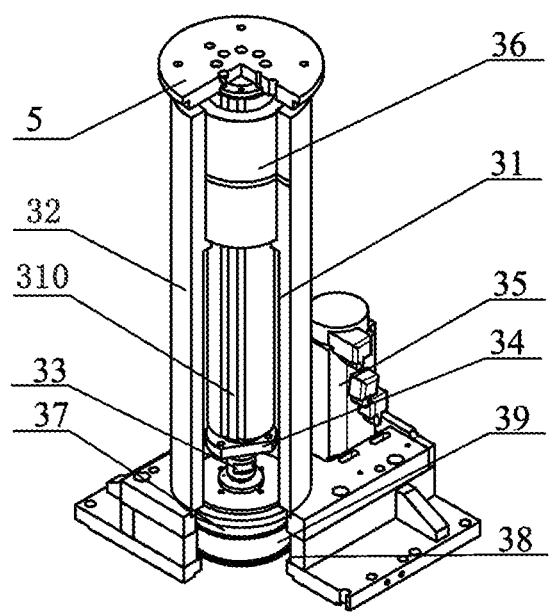
FIG. 3 is a structural schematic diagram of the Z-shaft positioning portion of an embodiment of the invention.

FIG. 1 through FIG. 3 show the specific structure of according to one preferred embodiment. Structural features of each element of the invention will be described hereinafter in details. While if directions (upper, lower, left, right, front, and back) are described, descriptions are conducted with reference to the structure as shown in FIG. 1. However, the actual use directions of the invention are not limited to this.

The structure shown in FIG. 1, provides a straight-line flexible positioning device including an X-shaft positioning portion 1, a Y-shaft positioning portion 2 and a Z-shaft positioning portion 3, wherein the X-shaft positioning portion 1 includes an X-shaft pedestal 11, an X-shaft sliding rail 12 arranged on the X-shaft pedestal 11, an X-shaft sliding table 13 installed on the X-shaft sliding rail 12 and an X-shaft power unit driving the X-shaft sliding table 13 to move along the X-shaft sliding rail 12 in front and back.

The X-shaft power unit includes an X-shaft screw shaft 14 installed on the X-shaft pedestal 11 parallel to the X-shaft sliding rail 12, an X-shaft screw nut 15 installed on the X-shaft screw shaft 14 and connected with the X-shaft sliding table 13 and an X-shaft servo motor 16 driving the X-shaft screw shaft 14 to rotate. The X-shaft screw shaft 14 is installed on the X-shaft pedestal 11 through an X-shaft installing base 141 at the end portion, the X-shaft screw shaft 14 is connected with the output shaft of the X-shaft servo motor 16 through a coupling 142, the X-shaft sliding rail 12 is provided at both sides of the X-shaft screw shaft 14 respectively.

The X-shaft sliding table 13 is installed on the X-shaft sliding rail 12 through an X-shaft sliding block 17, when the X-shaft servo motor 16 runs, the rotational motion of the X-shaft screw shaft 14 is converted into the linear motion of the X-shaft screw nut 15, and the X-shaft screw nut 15 pushes the X-shaft sliding table 13 to slide.

The X-shaft pedestal 11 is provided with an X-shaft limiting stopper 18, the X-shaft sliding table 13 is provided with a collision block 19 that can be matched with the limiting stopper 18 to limit the stroke of the X-shaft sliding table 13. When an electrical system is out of order, X-directional mechanical position limitation is realized. The X-shaft pedestal 11 is casted by opening mould. The rigidity of the whole device is effectively improved and the weight is lightened by reasonably arranging the structure and adding reinforcing ribs. The X-shaft pedestal 11 is installed with an X-shaft side protecting plate 111 at the outside of the two X-shaft sliding rails 12, the X-shaft pedestal 11 is installed with an X-shaft upper protecting plate 112 at the top portion of the X-shaft side protecting plate 111, the cross section of the X-shaft sliding table 13 is in a shape of hollow square with a via hole in the middle part, and the X-shaft sliding table 13 passes through the inside of the X-shaft upper protecting plate 112. The X-shaft side protecting plate 111 and the X-shaft upper protecting plate 112 jointly form an incompletely closed system to prevent welding slag from damaging the internal elements. An electric wire gas pipe moves in a protected drag chain 4 to improve the reliability of the flexible positioning unit.

Figure 4:
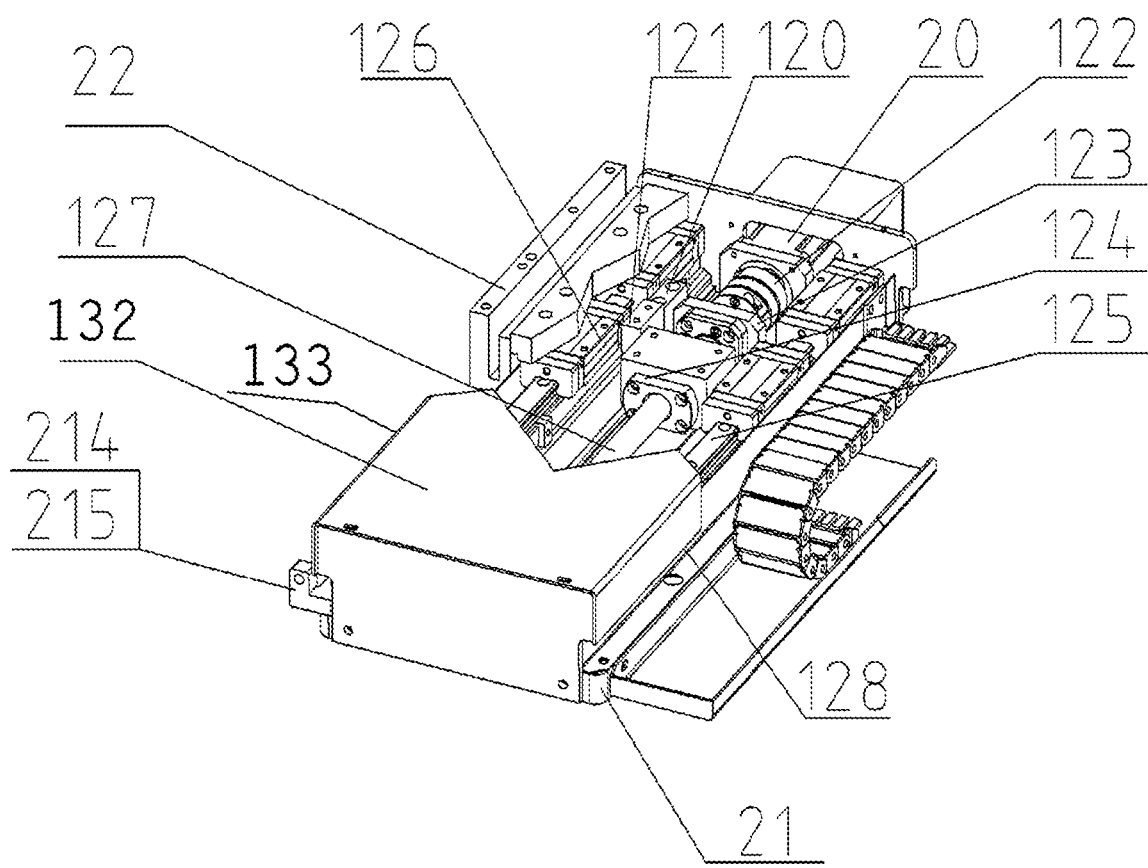
FIG. 4 is a diagram illustrating internal components of the Y-shaft positioning portion of an embodiment of the invention.

The Y-shaft positioning portion 2 and the X-shaft positioning portion 1 are in a similar structure. FIG. 4 is a diagram illustrating the internal components of the Y-shaft positioning portion. The Y-shaft positioning portion includes a Y-shaft pedestal 21 connected with the X-shaft sliding table 13 and a Y-shaft sliding rail 125 arranged on the Y-shaft pedestal 21. Perpendicular to the X-shaft sliding rail, a Y-shaft sliding table 22 is installed on the Y-shaft sliding rail 125 and the Y-shaft sliding table is driven by a Y-shaft power unit to move along the Y-shaft sliding rail 125 to the left and right. The Y-shaft power unit includes a Y-shaft screw shaft 127 installed on the Y-shaft pedestal parallel to the Y-shaft sliding rail 125, a Y-shaft screw nut 124 installed on the Y-shaft screw shaft 127 and connected with the Y-shaft sliding table, and a Y-shaft servo motor 20 driving the Y-shaft screw shaft 127 to rotate.

The Y-shaft screw shaft 127 is installed on the Y-shaft pedestal 21 through the Y-shaft installing base 123 at the end portion, and connected with the output shaft of the Y-shaft servo motor 20 through a coupling 122. When the Y-shaft servo motor 20 is running, the rotational motion of the Y-shaft screw shaft 127 is converted into the linear motion of the Y-shaft screw nut 124, and the Y-shaft screw nut 124 pushes the Y-shaft sliding table 22 to slide.

The Y-shaft pedestal 21 is provided with a Y-shaft limiting stopper 120, the Y-shaft sliding table is provided with a collision block 121 that can be matched with the limiting stopper to limit the stroke of the Y-shaft sliding table. When an electrical system is out of order, Y-directional mechanical position limitation is realized. The Y-shaft pedestal 21 is casted by opening mould. The rigidity of the whole device is effectively improved and the weight is lightened by reasonably arranging the structure and adding reinforcing ribs. The Y-shaft sliding rail 125 is arranged at both sides of the Y-shaft screw shaft 127 respectively. The Y-shaft sliding table is installed on the Y-shaft sliding rail 125 through the Y-shaft sliding block 126 and the Y-shaft pedestal 21 is installed with a Y-shaft side protecting plate 128 at the outside of the two Y-shaft sliding rails.

The Y-shaft pedestal 21 is installed with a Y-shaft upper protecting plate at the top portion of the Y-shaft side protecting plate. The cross section of the Y-shaft sliding table 22 is in a shape of hollow square with a via hole in the middle part and the Y-shaft side protecting plate passes through the inside of the Y-shaft sliding table. The Y-shaft side protecting plate and the Y-shaft upper protecting plate jointly form an incompletely closed system to prevent welding slag from damaging the internal elements. An electric wire gas pipe moves in a protected drag chain to improve the reliability of the flexible positioning unit.

The X-shaft pedestal 11 is provided with a ruler 113 for indicating the position of the Y-shaft pedestal, and the X-shaft pedestal 11 is installed with an X-shaft aligning base 114 and an X-shaft aligning block 115 installed on the X-shaft aligning base 114. The X-shaft aligning block 115 is installed on the X-shaft pedestal 11 through the X-shaft aligning base 114 to realize the aligning in the X-direction. After aligning, the X-shaft aligning block 115 is taken away.

Similar to the X-shaft positioning portion, the Y-shaft pedestal is provided with a ruler for indicating the position of the stand column, and the Y-shaft pedestal is installed with a Y-shaft aligning base 214 and a Y-shaft aligning block 215 installed on the Y-shaft aligning base 214. The servo motors of the X-shaft positioning portion 1 and the Y-shaft positioning portion 2 are high-resolution motors. The screw is high-precision screw and a guide rail is provided between the sliding table and the pedestal for guiding, so that high-precision positioning in X direction and Y direction can be realized.

The Z-shaft positioning portion 3 includes a stand column 32 connected with the Y-shaft sliding table and is provided with an inner guiding chamber 31, a Z-shaft screw shaft 33 installed in the inner guiding chamber 31, a Z-shaft screw nut 34 installed on the Z-shaft screw shaft 33, and a Z-shaft servo motor 35 driving the Z-shaft screw shaft 33 to rotate. The Z-shaft screw shaft 33 is vertically arranged perpendicular to the X-shaft sliding rail 12 and the Y-shaft sliding rail. The Z-shaft screw nut 34 is fixedly connected with a spline shaft 310 sheathed outside the Z-shaft screw shaft 33. The top portion of the inner guiding chamber 31 on the stand column 32 is provided with a spline nut 36 for the spline shaft 310 to pass through, and the top end of the spline shaft 310 extends out of the inner guiding chamber 31 and an installation panel 5 is arranged above the stand column 32. The Z-shaft screw shaft 33 is installed on the stand column 32 through a Z-shaft installing base 37 located at the bottom of the inner guiding chamber 31.

In an embodiment, a transmission chamber 38 is formed below the inner guiding chamber 31 on the stand column 32. A driven pulley 39 is installed in the transmission chamber 38 connected with the Z-shaft screw shaft 33. The Z-shaft servo motor 35 is installed on the stand column 32 through a motor installing plate, and a driving pulley connected with the driven pulley 39 through a synchronous belt is installed in the transmission chamber 38 on the output shaft of the Z-shaft servo motor 35. When the Z-shaft servo motor 35 is running, the Z-shaft servo motor 35 drives a driving pulley, and the driving pulley drives the driven pulley 39 to enable the Z-shaft screw shaft 33 connected therewith to rotate. The Z-shaft screw shaft 33 converts the rotational motion of the Z-shaft servo motor 35 to the vertical lifting motion of the Z-shaft screw nut 34, and the Z-shaft screw nut 34 pushes the installation panel 5 installed on the spline shaft 310 to implement the vertical lifting motion. When the installation panel 5 is in the lifting motion, guiding is realized through the matching of the spline shaft 310 and the spline nut 34. This portion has small space occupation, high rigidity, and high load in order for the high-precision positioning requirement for heavy load to be met.

Of course the invention is not limited to the above-mentioned embodiments, and those skilled in the art can make equivalent variations or replacements without departing from the spirit of the invention. These equivalent variations or replacements shall all fall within the scope limited by the claims of the application.

What is claimed is:

1. A straight-line flexible positioning device, comprising:
   a X-shaft positioning portion, wherein the X-shaft positioning portion includes an X-shaft pedestal, an X-shaft sliding rail arranged on the X-shaft pedestal, an X-shaft sliding table installed on the X-shaft sliding rail and an X-shaft power unit driving the X-shaft sliding table to move along the X-shaft sliding rail in front and back;
   a Y-shaft positioning portion, wherein the Y-shaft positioning portion includes a Y-shaft pedestal connected with the X-shaft sliding table, a Y-shaft sliding rail arranged on the Y-shaft pedestal and perpendicular to the X-shaft sliding rail, a Y-shaft sliding table installed on the Y-shaft sliding rail and a Y-shaft power unit driving the Y-shaft sliding table to move along the Y-shaft sliding rail in left and right; and a Z-shaft positioning portion, wherein the Z-shaft positioning portion includes a stand column connected with the Y-shaft sliding table and is provided with an inner guiding chamber, a Z-shaft screw shaft installed in the inner guiding chamber, a Z-shaft screw nut installed on the Z-shaft screw shaft and a Z-shaft servo motor driving the Z-shaft screw shaft to rotate, wherein the Z-shaft screw shaft is vertically arranged perpendicular to the X-shaft sliding rail and the Y-shaft sliding rail, wherein the Z-shaft screw nut is fixedly connected with a spline shaft sheathed outside the Z-shaft screw shaft;

wherein a top portion of the inner guiding chamber on the stand column is provided with a spline nut for the spline shaft to pass through, wherein a top end of the spline shaft extends out of the inner guiding chamber, wherein an installation panel is arranged above the stand column;

wherein the Z-shaft screw shaft is installed on the stand column through a Z-shaft installing base located at the bottom of the inner guiding chamber;

wherein an X-shaft limiting stopper is arranged on the X-shaft pedestal, wherein the X-shaft sliding table is provided with a collision block that can be matched with the limiting stopper to limit the stroke of the X-shaft sliding table;

wherein the X-shaft sliding rail is arranged at both sides of the X-shaft screw shaft respectively, wherein the X-shaft sliding table is installed on the X-shaft sliding rail through an X-shaft sliding block;

wherein the X-shaft pedestal is installed with an X-shaft side protecting plate at the outside of two X-shaft sliding rails, wherein the X-shaft pedestal is installed with an X-shaft upper protecting plate at the top portion of the X-shaft side protecting plate, wherein the X-shaft sliding table passes through the inside of the X-shaft upper protecting plate;

wherein the X-shaft pedestal is provided with a ruler for indicating the position of the Y-shaft pedestal, wherein the X-shaft pedestal is installed with an X-shaft aligning base and an X-shaft aligning block installed on the X-shaft aligning base.

2. The straight-line flexible positioning device of claim 1, wherein a transmission chamber is formed below the inner guiding chamber on the stand column.

3. The straight-line flexible positioning device of claim 2, wherein a driven pulley is installed in the transmission chamber connected with the Z-shaft screw shaft, wherein the Z-shaft servo motor is installed on the stand column through a motor installing plate.

4. The straight-line flexible positioning device of claim 3, wherein a driving pulley connected with the driven pulley through a synchronous belt is installed in the transmission chamber on the output shaft of the Z-shaft servo motor.

5. The straight-line flexible positioning device of claim 1, wherein the X-shaft power unit comprises an X-shaft screw shaft installed on the X-shaft pedestal parallel to the X-shaft sliding rail, an X-shaft screw nut installed on the X-shaft screw shaft and connected with the X-shaft sliding table, and an X-shaft servo motor driving the X-shaft screw shaft to rotate.

6. The straight-line flexible positioning device of claim 1, wherein the X-shaft screw shaft is installed on the X-shaft pedestal through an X-shaft installing base at the end portion, wherein the X-shaft screw shaft is connected with the output shaft of an X-shaft servo motor through a coupling.

7. The straight-line flexible positioning device of claim 1, wherein the Y-shaft power unit comprises a Y-shaft screw shaft installed on the Y-shaft pedestal parallel to the Y-shaft sliding rail, a Y-shaft screw nut installed on the Y-shaft screw shaft and connected with the Y-shaft sliding table, and a Y-shaft servo motor driving the Y-shaft screw shaft to rotate.

8. The straight-line flexible positioning device of claim 1, wherein the Y-shaft screw shaft is installed on the Y-shaft pedestal through a Y-shaft installing base at the end portion, wherein the Y-shaft screw shaft is connected with the output shaft of the Y-shaft servo motor through a coupling, a Y-shaft limiting stopper is arranged on the Y-shaft pedestal, wherein the Y-shaft sliding table is provided with a collision block that can be matched with the limiting stopper to limit the stroke of the Y-shaft sliding table.

9. The straight-line flexible positioning device according to claim 8, wherein the Y-shaft sliding rail is arranged at both sides of the Y-shaft screw shaft respectively, wherein the Y-shaft sliding table is installed on the Y-shaft sliding rail through a Y-shaft sliding block.

10. The straight-line flexible positioning device according to claim 9, wherein the Y-shaft pedestal is installed with a Y-shaft side protecting plate at the outside of the two Y-shaft sliding rails, wherein the Y-shaft pedestal is installed with a Y-shaft upper protecting plate at the top portion of the Y-shaft side protecting plate, wherein the Y-shaft side protecting plate passes through the inside of the Y-shaft sliding table.

11. The straight-line flexible positioning device according to claim 9, wherein the Y-shaft pedestal is provided with a ruler for indicating the position of the stand column, wherein the Y-shaft pedestal is installed with a Y-shaft aligning base and a Y-shaft aligning block installed on the Y-shaft aligning base.

* * * * *